Patented Nov. 12, 1935

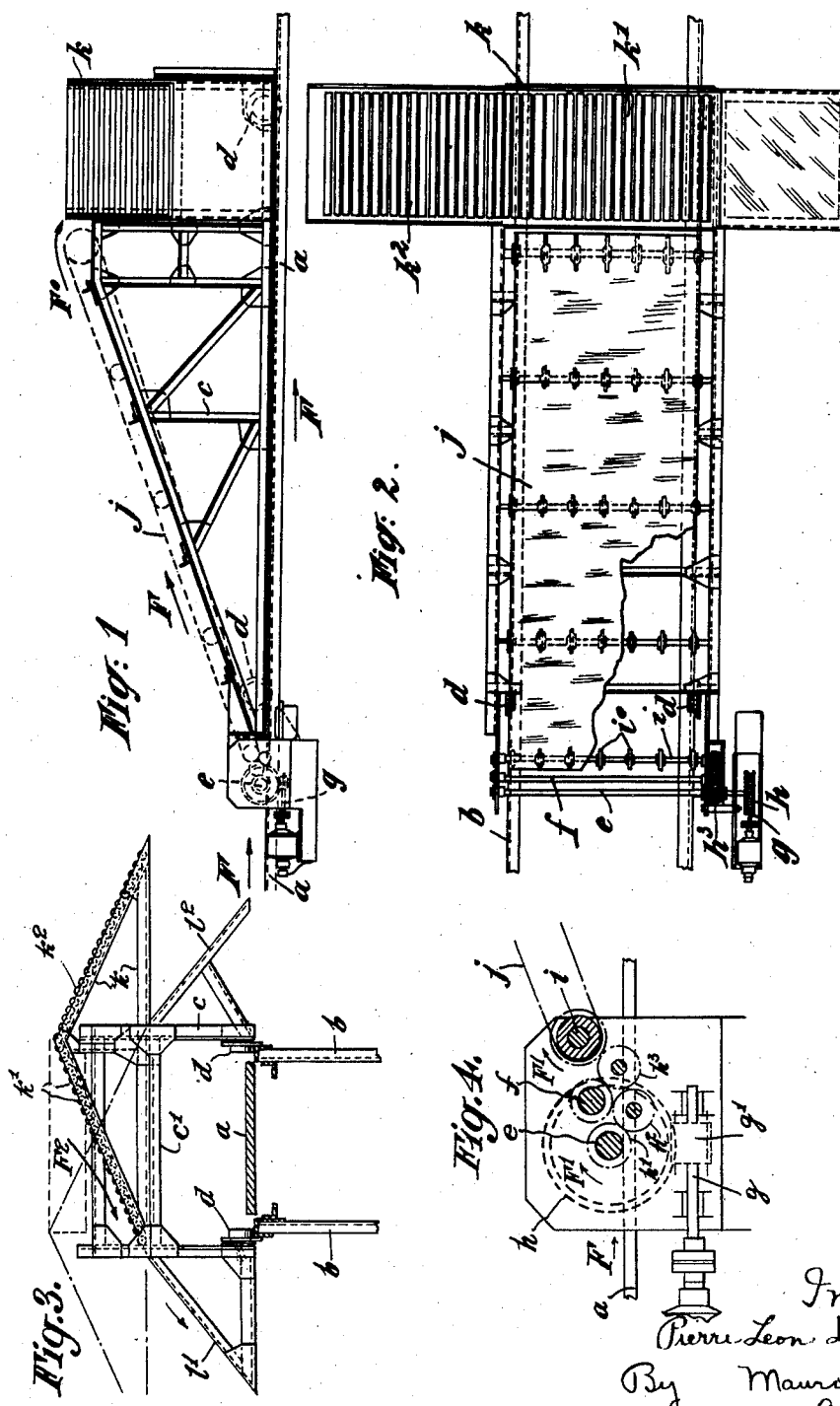

2,020,635

UNITED STATES PATENT OFFICE 2,020,635

APPARATUS FOR PICKING UP OBJECTS FROM A CONVEYER

Pierre Léon Derome, Bavay, France, assignor to Etablissements A. Derome, (Société Anonyme), Bavay, France Application July 5, 1933, Serial No. 679,131
In France July 7, 1932

5 Claims. (Cl. 198—185)

The object of the present invention is to provide a pick-up apparatus for a horizontal or inclined conveyer, that is to say an apparatus that can be brought above a conveyer at a desired place, and which is intended to pick up various materials or products such as bags filled with a fertilizer, nitrate, bundles, boxes, etc., and to automatically switch them into a direction making with that of the conveyer any desired angle, or even into the same direction if the products moved along the conveyer must be returned thereto or brought to a higher level.

According to an embodiment of my invention, the pick-up apparatus consists of a moving bridge comprising in combination, on the one hand a train of rollers driven all in the same direction and disposed over the conveyer so as to be in the path of travel of the products that are carried on it, on the other hand an inclined moving belt for conveying the articles and finally a structure including two inclined ways sloping in opposite directions, said structure being adapted to be given a lateral displacement permitting to shoot the products picked up from the conveyer either to the right hand side or the left hand side thereof.

A preferred embodiment of my invention will be hereinafter described with reference to the accompanying drawing given merely by way of example, and in which:

Figs. 1, 2 and 3 are a side view, a plan view, and an end view respectively of the pick-up apparatus according to my invention;

Fig. 4 is a detailed view.

A conveyer $a$ which may be of any kind whatever, is disposed horizontally near the ground or at the upper part of a metallic frame $b$ as shown in Fig. 3; and carries with it in the direction of arrow F, the articles of any kind that have been dropped onto it.

The pick-up apparatus according to the present invention is brought to the point where it is desired to remove these articles or products for switching them into the desired direction. Said pick-up apparatus comprises a frame $c$, preferably metallic, provided with wheels or rollers $d$ disposed on either side of conveyer $a$, and which rolls either on the ground or on rails provided at the upper part of a metallic frame $b$.

On one of the ends of frame $c$ there is provided a train of rollers or cylinders $e$, $f$, rotating in the same direction, shown by arrow $F^1$, (Fig. 4), and disposed as close as possible to conveyer $a$ without however being in contact therewith. The circumferential velocity of rollers or cylinders $e$, $f$, is equal to, or higher than, the linear velocity of the conveyer, and the diameter of the cylinders is as small as possible.

Said cylinders are covered with rubber for increasing the adhesion, or they may be grooved, ribbed, etc.

Cylinders $e$, $f$, are driven by any suitable gear, for instance the one that is shown in the detailed view of Fig. 4. The driving shaft $g$ has keyed to itself a worm $g^1$ meshing with a worm wheel $h$, the spindle of which carries a pinion $h^1$ keyed on the spindle of cylinder $e$. This pinion $h^1$ is in mesh with a reversing gear $h^2$ which causes cylinder $f$ to rotate in the same direction $F^1$ as cylinder $e$.

Another reversing gear $h^3$ makes it possible to drive a shaft $i$ carrying sprocket wheels $i^0$ keyed thereto, so that said sprocket wheels are driven in the same direction as $F^1$ as rollers $e$, $f$. The sprocket wheels $i^0$ drive an endless belt $j$.

It will be understood that under these conditions, the article or object that is moving along conveyer $a$ in the direction of the pick-up apparatus butts against roller $e$ and is lifted and directed toward roller $f$ which conveys it onto belt $j$.

The latter brings it to the upper part of supporting frame $c$ where it is dropped (arrow $F^0$ Fig. 1) onto a structure $k$. This structure preferably includes as shown in Fig. 3 two symmetrical inclined ways $k^1$, $k^2$.

This structure $k$ can be moved transversely with respect to supporting frame $c$, that is to say it may occupy either the position shown in solid lines in Fig. 3, or the position shown in dotted lines. In either of these two positions, one of the two inclined ways $k^1$, $k^2$ is located in line with one of the stationary chutes or inclined ways $l^1$, $l^2$.

It will be understood that in the position of Fig. 3, the products or articles dropped by belt $j$ onto inclined way $k^1$ will be automatically directed toward the left hand side (arrow $F^2$ of Fig. 3).

On the contrary, for the position of structure $k$ shown in dotted lines, the products or articles to be dropped by endless band $j$ onto inclined way $k^2$ will be directed toward the right hand side of the conveyer.

While I have described what I deem to be practical and efficient embodiments of my invention, it should be well understood that I do not wish to be limited thereto, as there might be changes made in the arrangement, disposition and form of the parts without departing from the principle of my invention as comprehended within the scope of the appended claims.

What I claim is:

1. A pick-up apparatus for removing objects from a conveyer, which comprises in combination, a movable frame, at least one cylinder journalled in said frame so as to be positioned across said conveyer at a small distance above it, an upwardly inclined endless belt carried by said frame with its lower edge adjacent to said cylinder, driving means independent of said conveyer for rotating said cylinder about its axis with a peripheral speed at least equal to the linear speed of the conveyer under it, means, operatively connected with said driving means, for moving said endless belt in a direction such that the objects taken off from said conveyer by said cylinder are conveyed in an upward direction by said endless belt, and at least one inclined way located opposite the upper end of said endless belt for bringing the articles therefrom down substantially to the level of the conveyer.

2. A pick-up apparatus for removing objects from a conveyer, which comprises in combination, a movable frame, at least one cylinder journalled in said frame so as to be positioned across said conveyer at a small distance above it, an upwardly inclined endless belt carried by said frame with its lower edge adjacent to said cylinder, driving means independent of said conveyer for rotating said cylinder about its axis with a peripheral speed at least equal to the linear speed of the conveyer under it, means, operatively connected with said driving means, for moving said endless belt in a direction such that the objects taken off from said conveyer by said cylinder are conveyed in an upward direction by said endless belt, and a structure including two inclined ways rigidly connected together and sloping in opposite directions, adapted to slide transversely in said frame opposite the upper edge of said endless belt, so that the objects conveyed by said endless belt are caused to move down either toward the left hand side or toward the right hand side of the conveyer according to the position of said inclined ways with respect to the conveyer.

3. An apparatus according to claim 2 further comprising two inclined ways rigidly carried by said frame on either side thereof so that one of the two first mentioned inclined ways can be brought substantially into line with one of the two last mentioned inclined ways respectively.

4. A pick-up apparatus for removing objects from a conveyer, which comprises in combination, a movable frame, two parallel cylinders journalled in said frame so as to be positioned across said conveyer and above it with their axes located in an inclined plane with respect to said conveyer, the periphery of the lower cylinder being close to the surface of the conveyer, an upwardly inclined endless belt carried by said frame with its lower edge adjacent to said cylinder, said belt being substantially in line with said plane, driving means independent of said conveyer for rotating said cylinders both in the same direction about their axes with a peripheral speed at least equal to the linear speed of the conveyer under them, sprocket wheels operatively connected with said driving means for moving said endless belt in a direction such that the objects taken off from said conveyer by said cylinders are conveyed in an upward direction by said endless belt, and means for guiding the articles conveyed to the upper end of said endless belt down substantially to the level of the conveyer.

5. A pick-up apparatus for removing objects from a conveyer, which comprises in combination, a movable frame, at least one cylinder journalled in said frame so as to be positioned across said conveyer at a small distance above it, an upwardly inclined endless belt carried by said frame with its lower edge adjacent to said cylinder, driving means independent of said conveyer for rotating said cylinder about its axis with a peripheral speed at least equal to the linear speed of the conveyer under it, and means operatively connected with said driving means for moving said endless belt in a direction such that the objects taken off from said conveyer by said cylinders are conveyed in an upward direction by said endless belt.

PIERRE LÉON DEROME.